United States Patent
Kanai et al.

(10) Patent No.: US 10,954,961 B2
(45) Date of Patent: Mar. 23, 2021

(54) BLOWER DEVICE AND BLOWER SYSTEM EQUIPPED WITH BLOWER DEVICE

(71) Applicant: NIDEC COPAL ELECTRONICS CORPORATION, Tokyo (JP)

(72) Inventors: Takashi Kanai, Sano (JP); Hiroki Matsushita, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 68 days.

(21) Appl. No.: 16/370,006

(22) Filed: Mar. 29, 2019

(65) Prior Publication Data

US 2019/0226491 A1 Jul. 25, 2019

Related U.S. Application Data

(63) Continuation of application No. PCT/JP2017/035336, filed on Sep. 28, 2017.

(30) Foreign Application Priority Data

Dec. 5, 2016 (JP) ................................. 2016-235858

(51) Int. Cl.
*F04D 29/58* (2006.01)
*F04D 29/42* (2006.01)
(Continued)

(52) U.S. Cl.
CPC ......... *F04D 29/5806* (2013.01); *F04D 13/06* (2013.01); *F04D 13/14* (2013.01);
(Continued)

(58) Field of Classification Search
CPC .... F04D 29/5806; F04D 29/051; F04D 13/06; F04D 17/16; H02K 7/14
See application file for complete search history.

(56) References Cited

U.S. PATENT DOCUMENTS 2,939,399 A * 6/1960 Rutschi ............... F04D 13/0613
417/357
6,200,108 B1 * 3/2001 Caudill ................... F04D 13/06
165/47
(Continued)

FOREIGN PATENT DOCUMENTS

| CN | 102016323 A | * | 4/2011 | ......... F04D 29/5806 |
| CN | 103423173 A | * | 12/2013 | ............. F04D 25/06 |

(Continued)

OTHER PUBLICATIONS

International Search Report for International Application PCT/JP2017/035336, dated Dec. 26, 2017.
(Continued)

*Primary Examiner* — Eldon T Brockman
*Assistant Examiner* — Topaz L. Elliott
(74) *Attorney, Agent, or Firm* — Burris Law, PLLC

(57) ABSTRACT

A blower device includes a housing including an intake chamber, an accommodation chamber communicating with the intake chamber, and an exhaust port, a motor provided in the accommodation chamber and including a coil, a fan provided on a rotating shaft of the motor, a sealing member configured to seal up the intake chamber, and a flow path of the air which is introduced into a gap between a first surface of the fan and the housing, is returned from a flow path hole provided in the housing and communicating with the intake chamber to an opening, and is introduced to a second surface of the fan opposed to the first surface by an air-blowing operation of the fan.

9 Claims, 12 Drawing Sheets

(51) Int. Cl.
*F04D 29/051* (2006.01)
*F04D 17/16* (2006.01)
*F04D 13/06* (2006.01)
*F04D 13/14* (2006.01)
*H02K 11/33* (2016.01)
*H02K 7/14* (2006.01)

(52) U.S. Cl.
CPC ........... *F04D 17/16* (2013.01); *F04D 29/051* (2013.01); *F04D 29/4226* (2013.01); *F04D 29/5813* (2013.01); *H02K 7/14* (2013.01); *H02K 11/33* (2016.01)

(56) References Cited

U.S. PATENT DOCUMENTS

| | | | | |
|---|---|---|---|---|
| 6,498,410 | B1* | 12/2002 | Yashiro | F04D 19/048 |
| | | | | 310/90 |
| 9,777,746 | B2* | 10/2017 | Maier | F04D 17/122 |
| 10,092,716 | B2* | 10/2018 | Velzy | A61M 16/107 |
| 2012/0017617 | A1* | 1/2012 | Beers | F04D 29/584 |
| | | | | 62/118 |
| 2015/0023782 | A1* | 1/2015 | Velzy | A61M 16/107 |
| | | | | 415/119 |
| 2015/0064026 | A1* | 3/2015 | Maier | F04D 25/0606 |
| | | | | 417/53 |
| 2016/0218590 | A1* | 7/2016 | Oxman | H02K 7/18 |
| 2018/0026496 | A1* | 1/2018 | Zhi | H02K 11/25 |
| | | | | 310/68 B |
| 2019/0226495 | A1* | 7/2019 | Kanai | H02K 5/18 |

FOREIGN PATENT DOCUMENTS

| | | | | |
|---|---|---|---|---|
| CN | 103562553 | A * | 2/2014 | ......... F04D 29/5826 |
| CN | 107313989 | A * | 11/2017 | ............ F04D 25/06 |
| JP | H03111700 | | 5/1991 | |
| JP | H07158587 | | 6/1995 | |
| JP | 2006226211 | | 8/2006 | |
| JP | 5588747 | | 9/2014 | |
| JP | 2016133038 | | 7/2016 | |
| WO | 2004055380 | | 7/2004 | |

OTHER PUBLICATIONS

Office Action issued in corresponding Japanese Application No. 2016-235858, dated May 26, 2020.

* cited by examiner

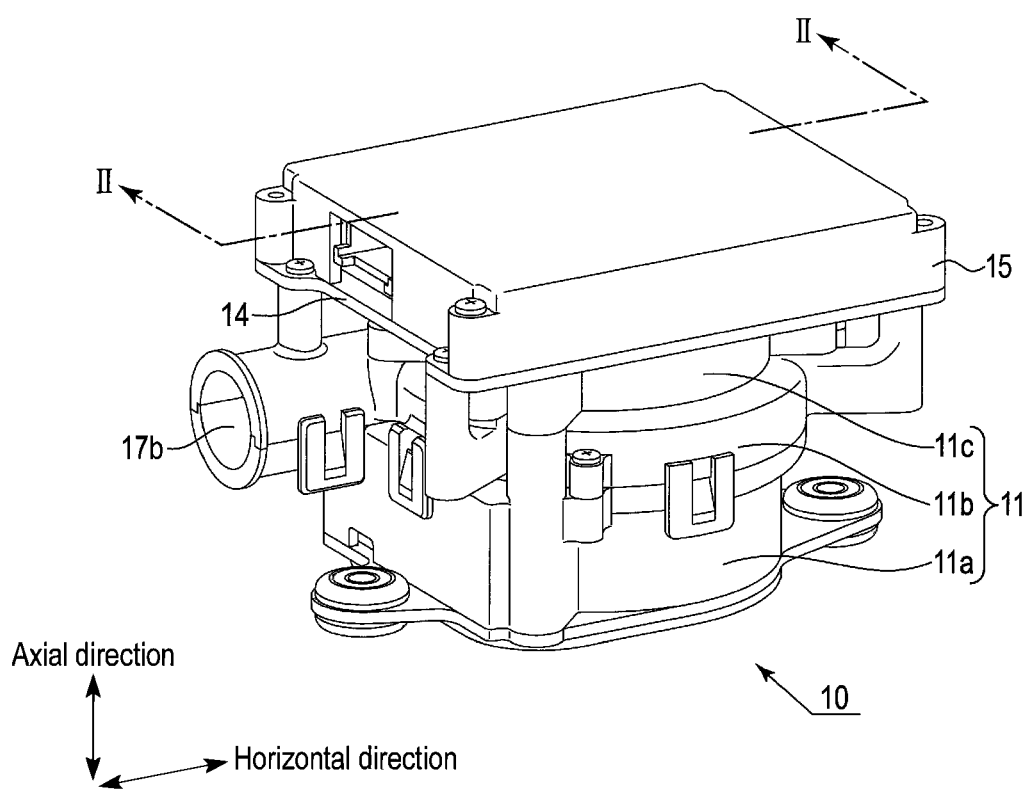
F I G. 1

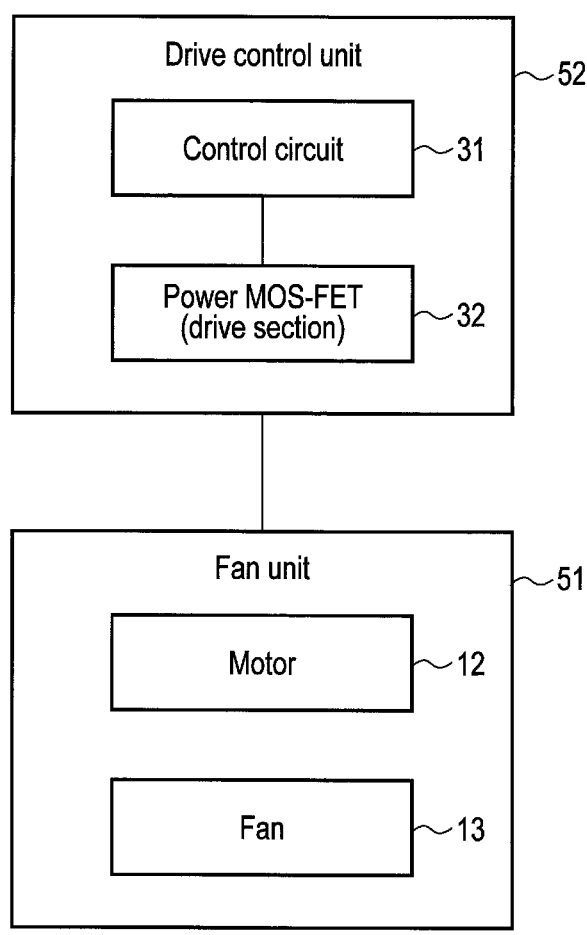
F I G. 3

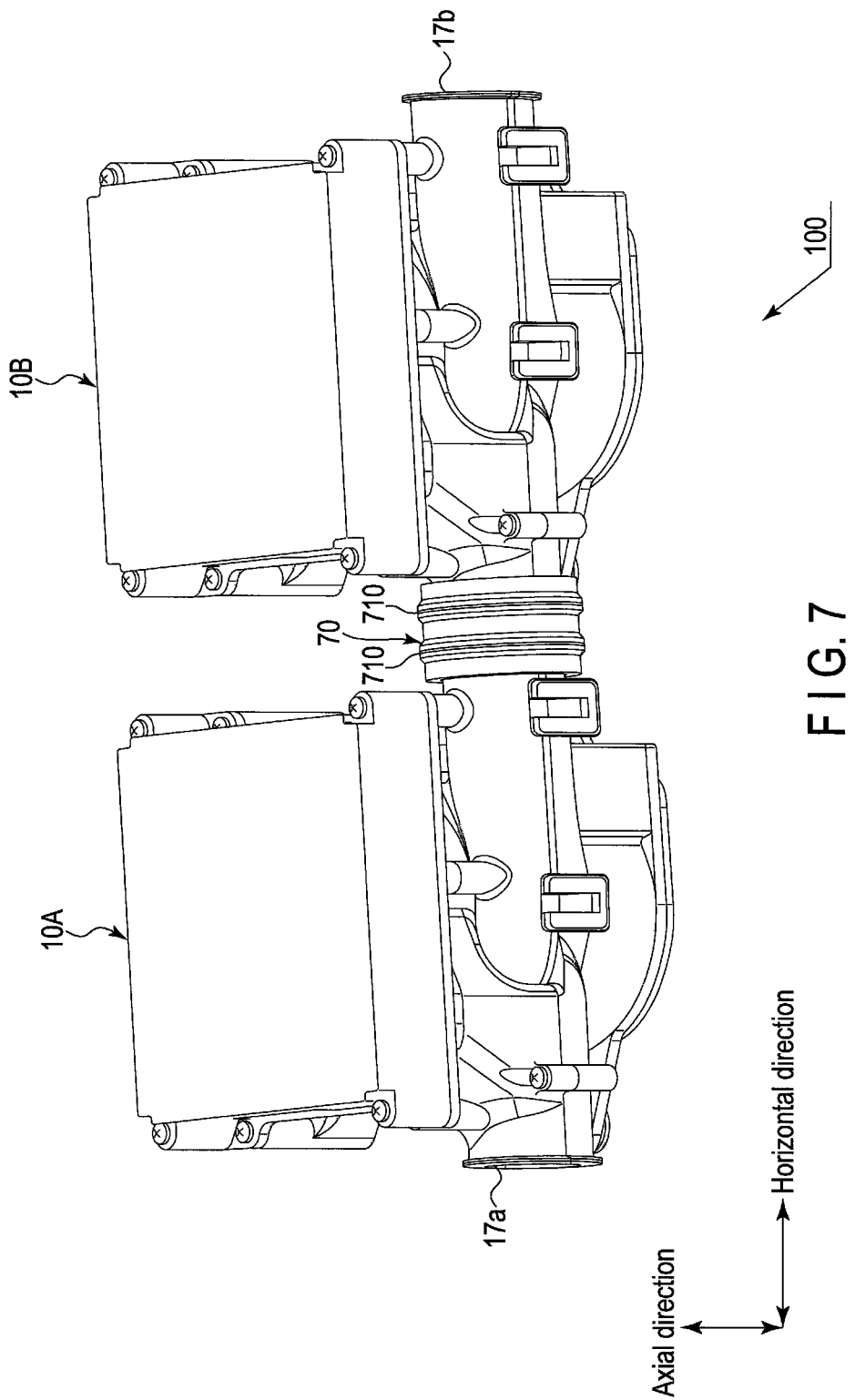
F I G. 7

US 10,954,961 B2

BLOWER DEVICE AND BLOWER SYSTEM EQUIPPED WITH BLOWER DEVICE

CROSS-REFERENCE TO RELATED APPLICATIONS

This application is a continuation of International Application No. PCT/JP2017/035336, filed on Sep. 28, 2017, which claims priority to and the benefit of JP 2016-235858 filed on Dec. 5, 2016. The disclosures of the above applications are incorporated herein by reference.

FIELD

The present disclosure relates to a blower device and blower system equipped with the blower device.

BACKGROUND

The statements in this section merely provide background information related to the present disclosure and may not constitute prior art.

Among blower devices configured to discharge air taken in from an intake port to an exhaust port, there is a blower device or the like provided with an air dynamic pressure bearing in which at the time of, for example, rotation, the rotor and stator are not in contact with each other (see, for example, Patent Literature 1).

A blower device provided with an air dynamic pressure bearing has a longer operating life and lower noise than a blower device or the like which is provided with ball bearings and in which the rotor and stator are in direct contact with each other. Accordingly, a blower device provided with an air dynamic pressure bearing is utilized as a blower device for an artificial respirator.

However, in a blower device provided with the air dynamic pressure bearing, a pressure difference occurs between top surfaces and undersurfaces of fan blades, the fan are moved from the predetermined position in the thrust direction due to the occurred pressure difference, and there is a possibility of the fan being brought into contact with the housing which is the case body in the worst case.

Moreover, in the case of a blower system in which a plurality of blower devices are connected in series (cascade-connected) for the purpose of enhancing the pressure, the above-mentioned problem becomes more conspicuous. More specifically, in the blower system, the pressure of the blower devices on the lower-stages, i.e., on the second and subsequent stages becomes higher than the pressure of the blower device on the upper-stage side, and hence an imbalance between the pressure applied to the top surface and undersurface of the fan of each of the blower devices on the lower-stage side becomes more obvious. Accordingly, as the air flow path advances toward the lower-stage side, the pressure difference occurring between the top surface and undersurface of the fan becomes greater, thus the possibility of the fan and housing being brought into contact with each other also becomes greater, and hence there is a limit to the pressure enhancement based on the cascade connection.

CITATION LIST

Patent Literature

Patent Literature 1: JP 5588747 B

SUMMARY

Embodiments described herein aim to provide a blower device in which a pressure difference occurring between the top surface and undersurface of the fan is suppressed, whereby the reliability can be improved and blower system equipped with the blower device.

A blower device according to an embodiment includes a housing including an intake chamber configured to take in external air from an intake port, an accommodation chamber communicating with the intake chamber through an opening, and an exhaust port configured to discharge the air inside the accommodation chamber to the outside; a motor provided in the accommodation chamber of the housing and including a coil; a fan provided on a rotating shaft of the motor and configured to introduce the air inside the intake chamber from the opening into the accommodation chamber and blow the air from the accommodation chamber to the exhaust port; a sealing member configured to seal up the intake chamber; and a flow path of the air which is introduced into a gap between a first surface of the fan and the housing, is returned from a flow path hole provided in the housing and communicating with the intake chamber to the opening, and is introduced to a second surface of the fan opposed to the first surface by an air-blowing operation of the fan.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view showing the overall configuration of a blower device according to a first embodiment.

FIG. 3 is a block diagram schematically showing the electrical configuration of the control system of the blower device according to the first embodiment.

FIG. 7 is a perspective view showing a blower system according to a second embodiment.

DETAILED DESCRIPTION

Embodiments of the present invention will be described below with reference to the accompanying drawings. It should be noted that in the following descriptions, functions and elements substantially identical to each other are denoted by identical reference numbers and are described as the need arises. Further, the drawings are schematic, and relationships between the thickness and planar dimensions, ratios of the thickness of each layer, and like may sometimes differ from those in the actual case.

First Embodiment

[Configuration]
[Overall Configuration]

Figure 2:
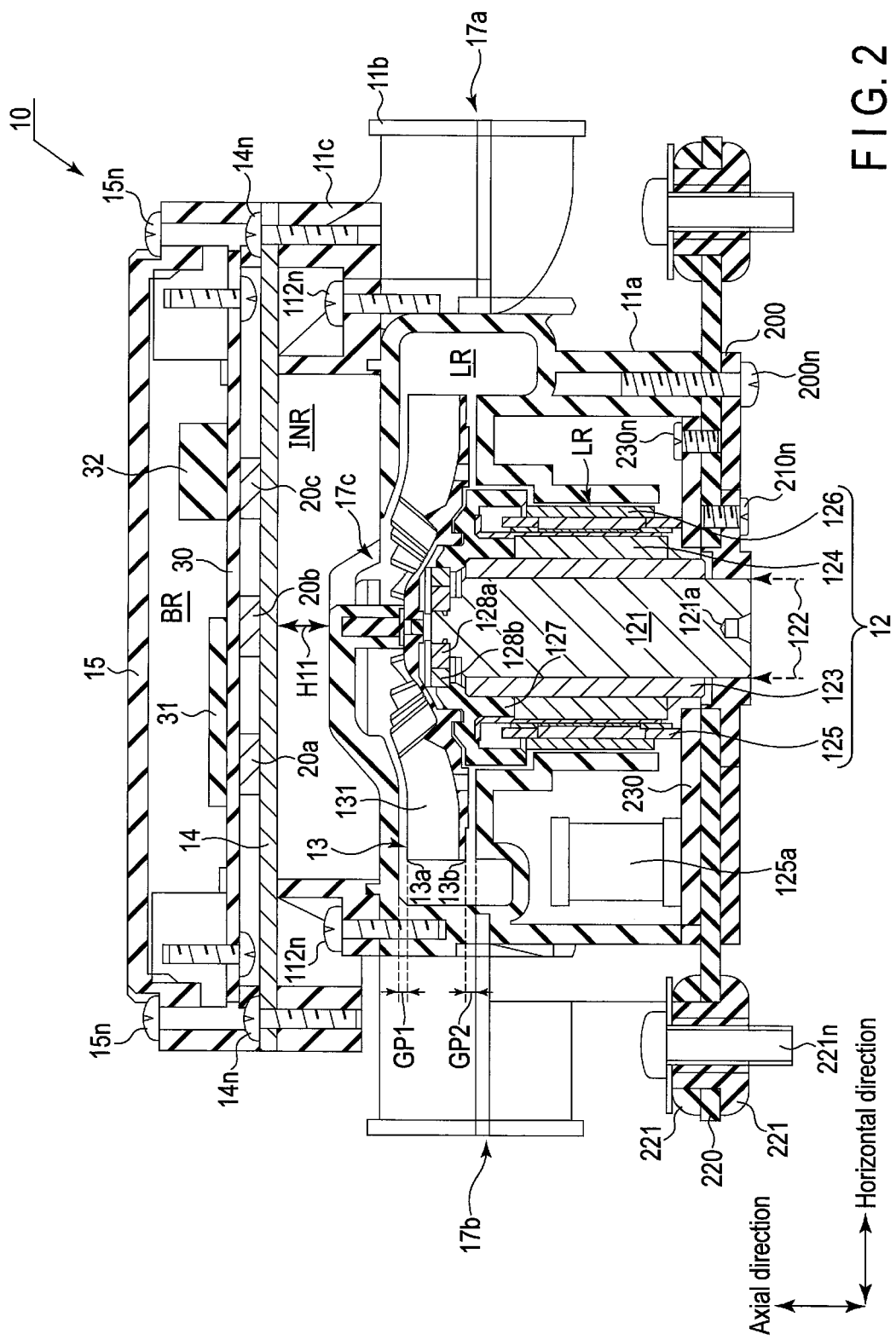
FIG. 2 is a cross-sectional view of the blower device viewed from the arrow direction along line II-II of FIG. 1.

The overall configuration of a blower device 10 according to a first embodiment will be described below by using FIG. 1 and FIG. 2. FIG. 1 is a perspective view showing the overall configuration of the blower device 10 according to the first embodiment. FIG. 2 is a cross-sectional view of the blower device 10 viewed from the arrow direction along line II-II of FIG. 1.

As shown in FIG. 1 and FIG. 2, the blower device 10 according to the first embodiment includes a housing 11, intake cover (sealing member) 14 configured to seal up an intake chamber INR provided inside the housing 11, and board cover 15. The housing 11 is constituted of three divided housing members 11a to 11c. The housing 11 includes an intake port 17a and exhaust port 17b. As will be described later, the intake port 17a is constituted of the housing members 11a and 11c, and exhaust port 17b is constituted of the housing members 11a and 11b. Inside the housing 11, an accommodation chamber LR communicating with the intake port 17a and exhaust port 17b and configured to accommodate therein a fan unit 51 is provided. The fan unit 51 includes a fan 13 and motor 12 configured to drive the fan 13.

The intake cover (sealing member) 14 is provided on the housing member 11c, and the housing member 11c and intake cover 14 constitute the intake chamber INR. The intake cover 14 is constituted of a material having excellent thermal conductivity such as aluminum, and functions as a heat sink.

A circuit board 30 is provided above the intake cover 14. Circuit components including a power MOS-FET 32 configured to drive the motor 12 and control circuit 31 configured to control the operation of the power MOS-FET 32 are arranged on the circuit board 30.

A plurality of plate-like heat sinks (heat-radiation members) 20a to 20c are provided between the intake cover 14 and circuit board 30. More specifically, the heat sink 20a is arranged beneath the control circuit 31, heat sink 20b is arranged beneath the control circuit 31 and at a central part in the vicinity of an opening 17c, and heat sink 20c is arranged beneath the power MOS-FET 32. The heat sinks 20a to 20c are constituted of a material excellent in thermal conductivity such as aluminum. Undersurfaces of the heat sinks 20a to 20c are, for example, pressure-welded to the top surface of the intake cover 14, and top surfaces of the heat sinks 20a to 20c are, for example, pressure-welded to the undersurface of the circuit board 30, whereby heat generated from the control circuit 31 and power MOS-FET 32 arranged on the circuit board 30 is conducted to the intake cover 14.

The board cover 15 is attached to the intake cover 14, and the circuit board 30 is covered with the board cover 15. The board cover 15 may be constituted of a material excellent in thermal conductivity such as aluminum.

It should be noted that the housing member 11a is provided on a base plate 200 arranged at the bottom part. An attaching member 220 configured to attach the blower device 10 to a predetermined position is provided on the base plate 200. The base plate 200 and attaching member 220 are fixed to each other with an attaching screw 210n penetrating the base plate 200 and attaching member 220. The attaching member 220 and a coil board 230 are fixed to each other with an attaching screw 230n penetrating the attaching member 220 and coil board 230. The base plate 200, attaching member 220, and housing member 11a are fixed to each other with an attaching screw 200n penetrating these three members. Further, cushion rubbers 221 sandwiching the top surface and undersurface of the attaching member 220 are arranged at ends of the attaching member 220. The blower device 10 is configured in such a manner that the blower device 10 can be attached to an arbitrary position by fixing attaching screws 221n penetrating the attaching member 220 and cushion rubbers 221 to predetermined attaching positions.

The motor 12 is, for example, a coreless motor. The motor 12 includes at least a shaft (rotating shaft) 121, minute gap 122, sleeve 123, magnet 124, coil 125, fixed yoke 126, hub 127, and thrust magnets 128a and 128b.

The shaft 121 is fixed to the base plate 200 with an attaching screw 121a. The minute gap 122 is a very small gap provided between the shaft 121 and sleeve 123. The sleeve 123 is provided at an outer circumferential part of the shaft 121 through the minute gap 122. The magnet 124 is provided at an outer circumferential part of the sleeve 123. The coil 125 is provided at an outer circumferential part of the magnet 124. The fixed yoke 126 is provided at an outer circumferential part of the coil 125 in order to form a predetermined magnetic circuit. The hub 127 is a rotary member configured to support the sleeve 123 and magnet 124 and cover the upper part of the shaft 121. The thrust magnet 128a is a ring-like magnet fixed to the upper part of the shaft 121. The thrust magnet 128b is a ring-like magnet fixed to the upper part of the hub 127 so as to face the aforementioned thrust magnet 128a. In this embodiment, the air dynamic pressure bearing is constituted of the above-mentioned configuration.

It should be noted that in the vicinity of the motor 12, a separate coil 125a is provided as an inductor electrically connected to the coil 125 through the coil board 230. Further, a reinforcing ring configured to prevent the magnet 124 from being broken by the centrifugal force due to the rotation of the fan 13 is provided between the magnet 124 and coil 125.

The fan 13 is arranged in the accommodation chamber LR, and is fixed to the hub 127 functioning as the rotary member. The fan 13 includes a plurality of fan blades 131 configured to blow the air introduced into the intake chamber INR from the intake port 17a to the exhaust port 17b through the opening 17c with a predetermined output (blast pressure and blast flow rate). The plurality of fan blades 131 are provided on the fan 13 at predetermined intervals, and each of the fan blades 131 is constituted of a plate-like member protruding in the axial direction coincident with the axis of the motor 12.

Furthermore, a predetermined gap GP1 is provided between the top surface 13a of the fan 13 and housing member 11b constituting the accommodation chamber LR, and predetermined gap GP2 is provided between the undersurface 13b of the fan 13 and housing member 11a constituting the accommodation chamber LR.

[Electrical Configuration]

FIG. 3 schematically shows the configuration of the control system of the blower device 10 according to the first embodiment.

As shown in FIG. 3, the electrical configuration of the control system of the blower device 10 includes a fan unit 51 provided with the motor 12 including the fan 13, and drive control unit 52 configured to control drive of the fan unit 51. The drive control unit 52 includes a power MOS-FET 32 configured to switch the drive electric power used to drive the motor 12, and control circuit 31 configured to control the operation of the power MOS-FET 32.

The power MOS-FET 32 is, for example, a power MOS-FET or the like of the high withstand voltage type, one end of a current path thereof not shown is electrically connected to a predetermined electric power source through a connector, the other end thereof is electrically connected to the coil 125, and control terminal thereof is electrically connected to the control circuit 31.

The control circuit 31 transmits a control signal to the control terminal of the power MOS-FET 32 on the basis of a drive status or the like of the fan unit 51, and controls the electric power to be supplied to the motor 12. Accordingly, the control circuit 31 may include a controller or the like configured to control, for example, the operation of the power MOS-FET 32.

[Air-Blowing Operation]

Figure 4:
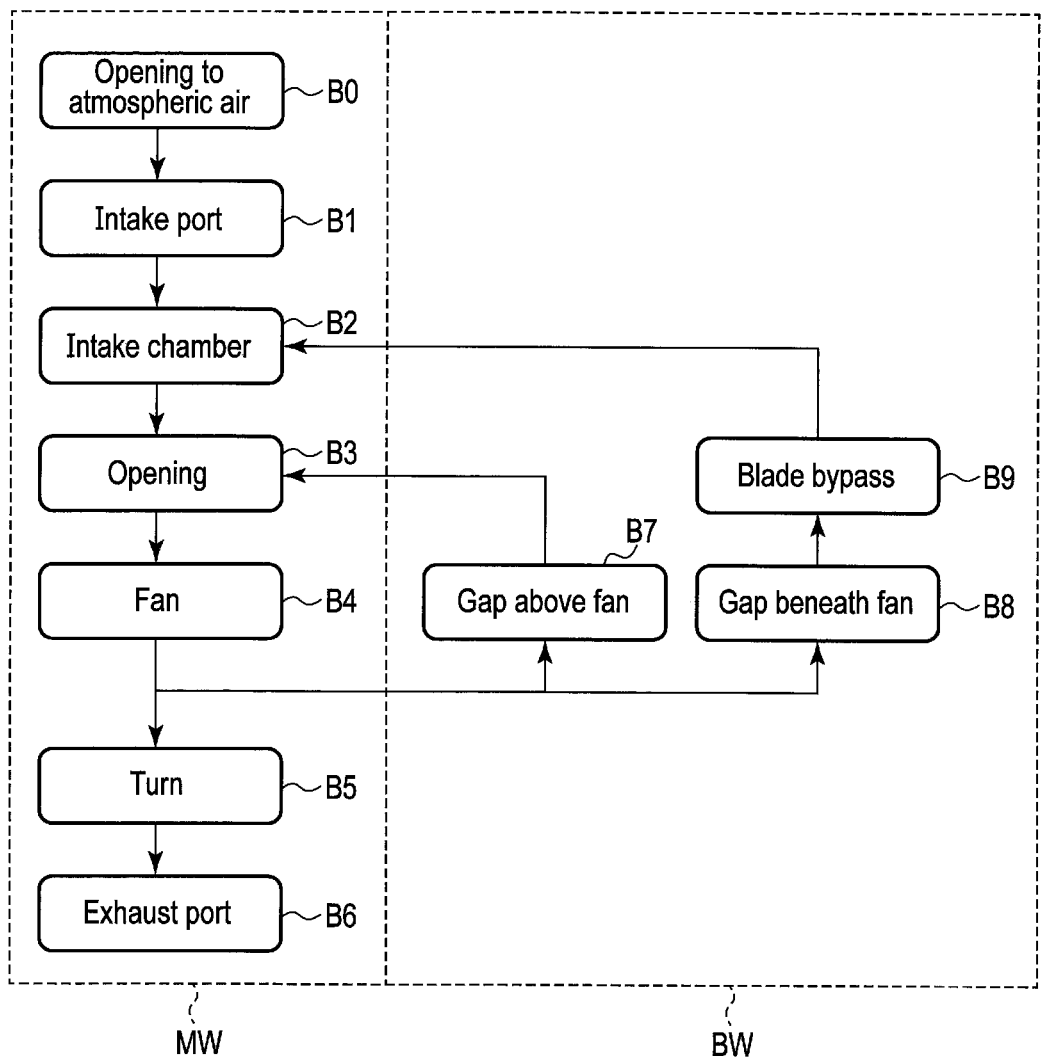
FIG. 4 is a flowchart showing the flow paths of the air-blowing operation to be carried out by the blower device according to the first embodiment.
Figure 5:
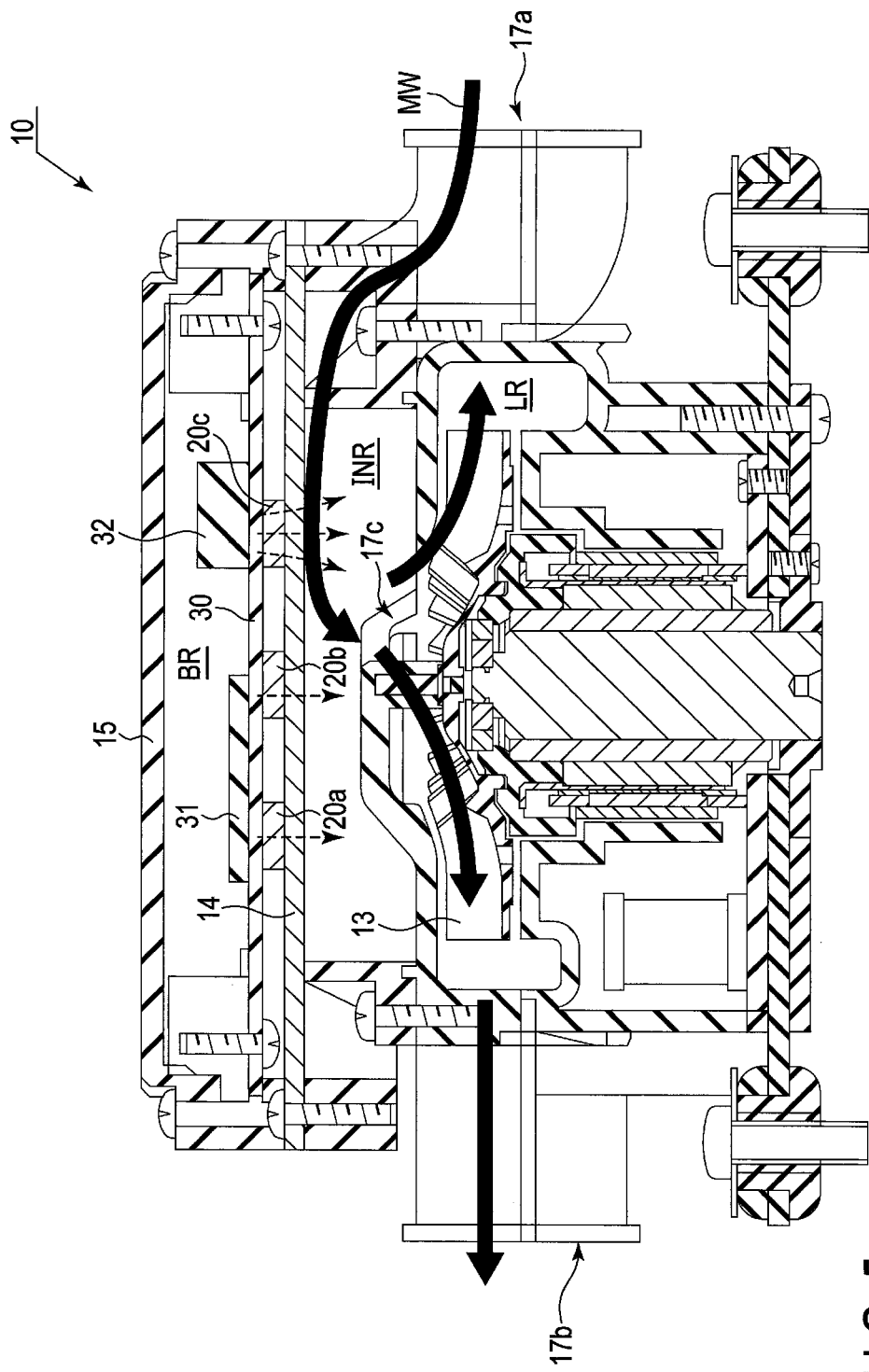
FIG. 5 is a cross-sectional view for explaining the main flow path of FIG. 4.
Figure 6:
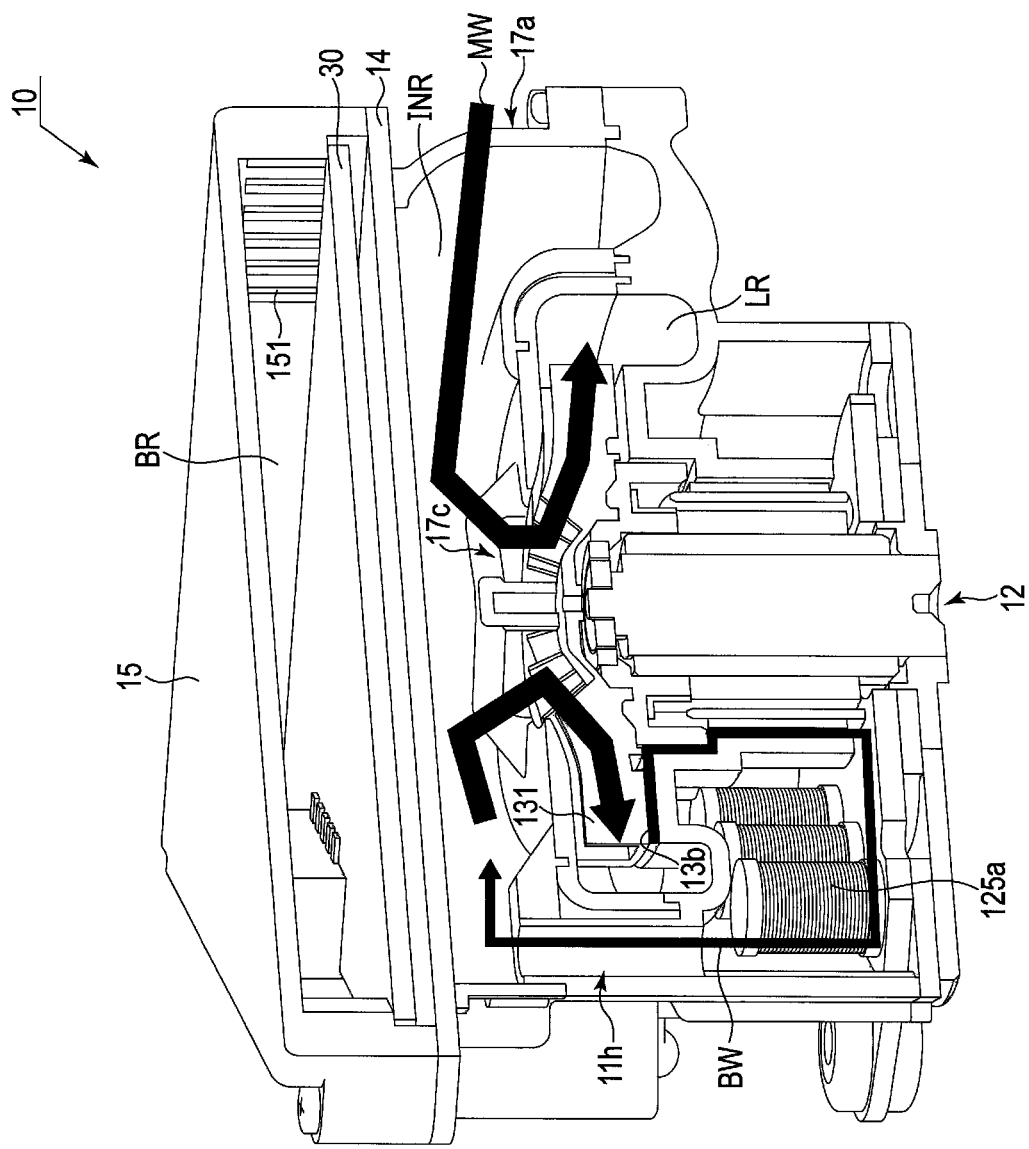
FIG. 6 is a cross-sectional view for explaining the bypass flow path of FIG. 4.

In the configuration described above, an air-blowing operation of the blower device 10 according to the first embodiment will be described below in detail by using FIG. 4 to FIG. 6. FIG. 4 is a flowchart showing the exhaust air flow paths of an air-blowing operation to be carried out by the blower device 10 according to the first embodiment. FIG. 5 is a view for explaining the main exhaust air flow path of FIG. 4. FIG. 6 is a view for explaining the bypass exhaust air flow path of FIG. 4. Descriptions will be given according to the flowchart of FIG. 4.

When the motor 12 is driven by the drive control unit 52, the fan 13 is rotated, and the pressure inside the blower device 10 becomes a negative pressure as compared with the outside atmospheric pressure, whereby the external air is introduced into the intake chamber INR from the intake port 17a (B0 to B2).

The air introduced into the intake chamber INR is further introduced into the accommodation chamber LR through the opening 17c of the housing member 11b, turns in the accommodation chamber LR, and is discharged from the exhaust port 17b to the outside with a predetermined output (blast pressure and blast flow rate) (B3 to B6). The above-mentioned flow path B0 to B6 constitute the main flow path MW of the air flow paths formed by the blower device 10.

Here, as shown in FIG. 5, the external air introduced into the intake chamber INR from the intake port 17a is brought into contact with the intake cover 14 as indicated by the solid arrow, absorbs the heat of the intake cover 14, passes through the accommodation chamber LR, and is then discharged from the exhaust port 17b. Accordingly, as indicated by the dashed arrows, it is possible to radiate the heat conducted from the control circuit 31 and power MOS-FET 32 which are heating elements to the intake cover 14 through the heat sinks 20a, 20b, and 20c to the air inside the intake chamber INR, and thereby cool the control circuit 31 and power MOS-FET 32.

Returning to FIG. 4, part of the air introduced into the accommodation chamber LR by the operation of the fan 13 returns to the opening 17c through the gap GP1 between the top surface 13a of the fan 13 and housing member 11b constituting the accommodation chamber LR, and is introduced again into the fan 13 (B7).

On the other hand, as shown in FIG. 6, part of the air introduced into the accommodation chamber LR by the operation of the fan 13 is, as indicated by the arrow BW, introduced into the gap GP2 between the undersurface 13b of the fan 13 and housing member 11a, and gap between the housing member 11a and motor 12. The air in these gaps is led to the inside of the housing member 11a in which the separate coil 125a is provided. The air inside the housing member 11a is introduced into the intake chamber INR through a flow path hole 11h provided in the side part of the housing member 11a, returns to the opening 17c, and is introduced again to the top surface 13a of the fan 13 (B8, B9). Accordingly, it is possible to suppress the pressure difference occurring between the top surfaces 13a and undersurfaces 13b of blades 131. Moreover, it is possible to cool the separate coil 125a by the flow path BW of the air introduced into the inside of the housing member 11a. The flow path B7 to B9 shown in FIG. 4 constitutes the bypass flow path (leakage flow path) BW of the air flow paths formed by the blower device 10.

[Function and Advantage]

As described above, the blower device 10 according to the first embodiment is provided with a flow path BW of the air introduced into the gap GP2 between the undersurface 13b of the fan 13 and housing member 11a, and gap between the housing member 11a and motor 12, introduced into the intake chamber INR through the flow path hole 11h provided in the housing member 11a, returned to the opening 17c, and introduced again to the top surface 13a of the fan 13 by the air-blowing operation of the fan 13 (B8 and B9 of FIG. 4, FIG. 6).

As described above, the flow path BW of the air from the undersurfaces 13b of the blades 131 communicates with the main flow path MW connected to top surfaces 13a of the blades 131 without, for example, being opened to the atmospheric air, and hence it is possible to suppress the pressure difference occurring between the top surfaces 13a and undersurfaces 13b of the blades 131 of the fan 13. Accordingly, it is possible to prevent the fan 13 from being brought into contact with the housing 11 which is the case body, and improve the reliability. Furthermore, the bypass flow path BW communicates with the main flow path MW, and hence it is possible to improve the power efficiency of the blower device 10. Further, it is possible to cool the separate coil 125a by the flow path BW of the air led to the inside of the housing member 11a.

Moreover, the intake chamber INR is sealed up by the intake cover 14 which is a heat sink member, and is arranged in the flow path of the air flowing from the intake port 17a to the fan 13 (FIG. 2). Accordingly, it is possible to radiate the heat conducted from the control circuit 31 and power MOS-FET 32 which are heating elements to the intake cover 14 through the heat sinks 20a, 20b, and 20c to the air inside the intake chamber INR, and thereby cool the control circuit 31 and power MOS-FET 32. As a result, it is possible to prevent the temperature of the coil 125 of the motor 12 from being raised by the heat generated from the control circuit 31 and power MOS-FET 32, and prevent the output of the blower device 10 from being lowered.

Further, when utilized as a blower device for an artificial respirator, the blower device 10 need not be frequently subjected to an on/off operation of the air-blowing operation unlike the ordinary blower devices, whereas the blower device 10 is required of a longer-period and stable air-blowing operation. Accordingly, when the blower device 10 according to the first embodiment is employed as the blower device for the artificial respirator, it becomes possible to suppress the pressure difference between the top surface 13a and undersurface 13b of the fan, and stably carry out a reliable air-blowing operation.

Second Embodiment (Example of Blower System)

A blower system 100 according to a second embodiment will be described below by using FIG. 7 to FIG. 9. FIG. 7 is a perspective view showing the blower system 100 according to the second embodiment. The second embodiment is an example of a blower system 100 in which the blower devices 10 according to the first embodiment are cascade-connected.

[Configuration]

As shown in FIG. 7, in the blower system 100 according to the second embodiment, an exhaust port 17b and intake port 17a of two blower devices 10A and 10B according to the first embodiment are cascade-connected in series by means of a coupling member 70. One groove part 710 of the coupling member 70 is tightly fitted on the convex part of the exhaust port of the blower device 10A and the other groove part 710 thereof is tightly fitted on the convex part of the intake port of the blower device 10B, whereby the coupling member 70 couples these blower devices 10A and 10B to each other. Further, the coupling member 70 has a tubular shape of which a central part includes a predetermined corrugation, and hence the coupling member 70 is configured in such a manner as to be capable of expansion and contraction.

As will be described later, the two blower devices 10A and 10B are cascade-connected, whereby it is possible to enhance the pressure of the air discharged from the exhaust port 17b of the blower device 10B on the latter stage to substantially about twice the pressure of air discharged from a single blower device 10.

It should be noted that it is desirable that the blower device 10A on the former stage and blower device 10B on the latter stage be configured in such a manner that the bore shape of the exhaust port of the blower device 10A is identical to the bore shape of the intake port of the blower device 10B. Further, it is desirable that the blower device 10A and blower device 10B be configured in such a manner that the position of the exhaust port of the blower device 10A and position of the intake port of the blower device 10B have the same height.

Other configurations are substantially identical to the configuration described in the first embodiment, and hence their detailed descriptions are omitted.

[Air-Blowing Operation]

In the above-mentioned configuration, an air-blowing operation of the blower system 100 according to the second embodiment will be described below in detail by using FIG. 8 and FIG. 9. FIG. 8 is a flowchart showing exhaust air flow paths of the air-blowing operation to be carried out by the blower system 100 according to the second embodiment. FIG. 9 is an exploded perspective view for explaining the flow paths of the air-blowing operation of the blower system according to the second embodiment. It will be described along with the flowchart of FIG. 8.

Figure 8:
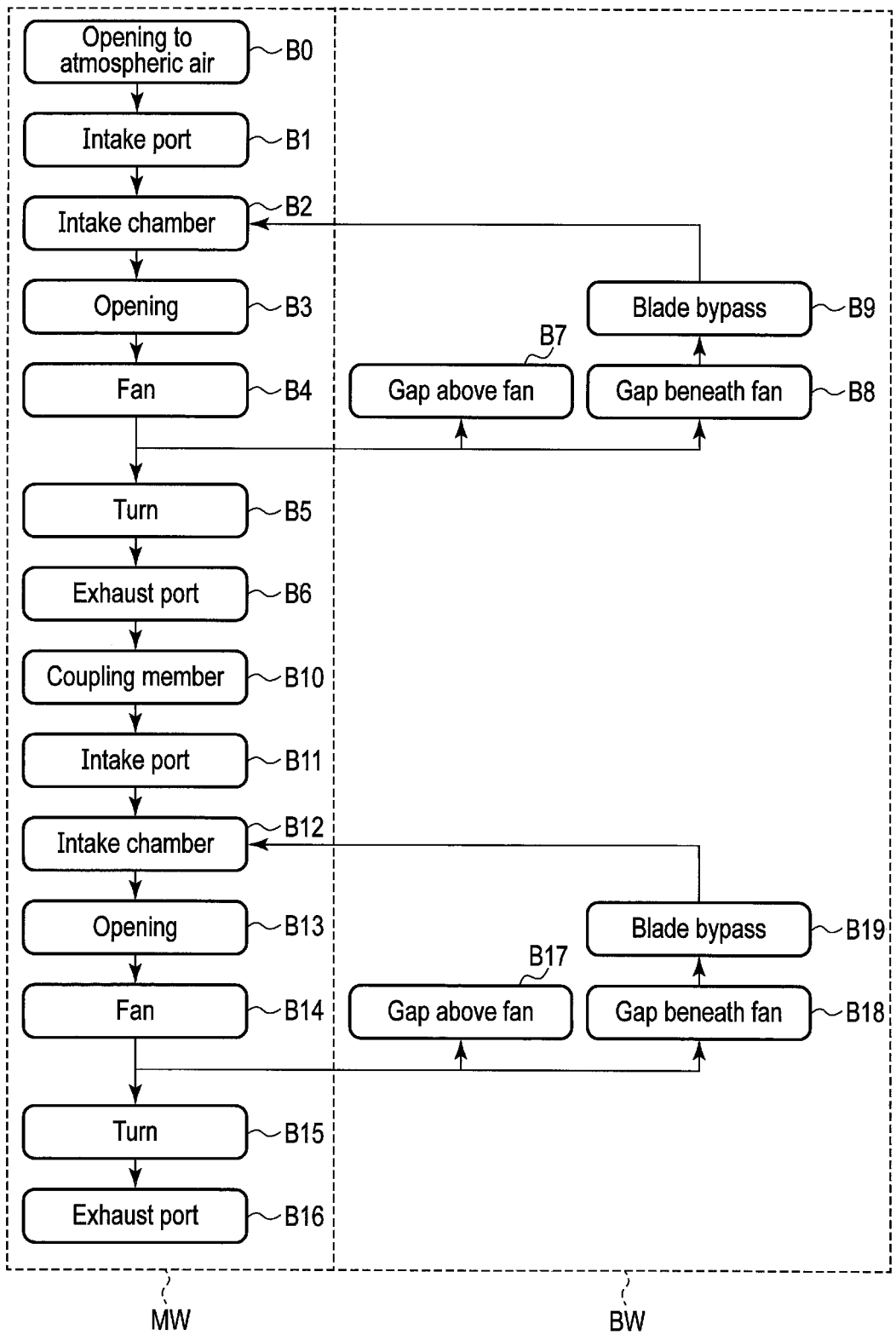
FIG. 8 is a flowchart showing the flow paths of the air-blowing operation of the blower system according to the second embodiment.

As shown in FIG. 8, as in the case of the first embodiment, the external air is discharged to the exhaust port 17b through the main flow path MW and bypass flow path BW of the blower device 10A (B0 to B9). Accordingly, as shown in FIG. 9, the air passing through the bypass flow path BW is introduced into the intake chamber INR through the flow path hole 11h provided in the side part of the housing 11, is returned to the opening 17c, and is introduced again to the top surface of the fan 13.

Returning to FIG. 8, the air discharged from the exhaust port 17b of the blower device 10A is introduced again into the intake chamber INR from the intake port 17a of the blower device 10B through the coupling member 70 (B10 to B12). At this time, the one groove part 710 of the coupling member 70 is tightly fitted on the convex part of the exhaust port 17b of the blower device 10A and the other groove part 710 thereof is tightly fitted on the convex part of the intake port 17a of the blower device 10B, whereby the coupling member 70 couples these blower devices 10A and 10B to each other. Accordingly, by virtue of the coupling member 70, the air discharged from the blower device 10A is again introduced from the intake port 17a of the blower device 10B while maintaining the pressure.

The air introduced into the intake chamber INR is introduced into the accommodation chamber LR through the opening 17c of the housing member 11b in the same manner in the state where the pressure thereof at the time when the air is discharged from the blower device 10A is maintained, then is turned in the accommodation chamber LR, and is discharged from the exhaust port 17b to the outside with a predetermined output (B13 to B16).

Part of the air introduced into the accommodation chamber LR by the operation of the fan 13 returns to the opening 17c in the same manner from the gap GP1 between the top surface 13a of the fan 13 and housing member 11b constituting the accommodation chamber LR and is introduced again into the fan 13 (B17).

On the other hand, part of the air introduced into the accommodation chamber LR by the operation of the fan 13 is introduced in the same manner into the gap GP2 between the undersurface 13b of the fan 13 of the blower device 10B and housing member 11a, and gap between the housing member 11a and motor 12. The air in these gaps is led to the inside of the housing member 11a in which the separate coil 125a is provided. As shown in FIG. 9, the air inside the housing member 11a is introduced into the intake chamber INR through the flow path hole 11h provided in the side part of the housing member 11a, returns to the opening 17c, and is introduced again to the top surface 13a of the fan 13 (B18, B19).

Other air-blowing operations are substantially identical to the first embodiment, and hence their detailed descriptions are omitted.

[Function and Advantage]

Here, in the case of a blower system or the like in which, for example, a plurality of blower devices are simply cascade-connected, and a leakage flow path occurring from the undersurfaces of the blades is opened to the atmospheric pressure, particularly in the blower device on the latter stage of the air flow path, i.e., on the higher-pressure side, imbalance of the pressure occurring between the pressure (exhaust air pressure of the former stage) on the intake side of the top surfaces of the blades and pressure of the undersurfaces of the blades is further increased as compared with the case of a single blower device. Accordingly, the blades are moved in the thrust direction (axial direction) by the pressure difference, and the possibility of the fan being brought into contact with the housing is increased.

Figure 9:
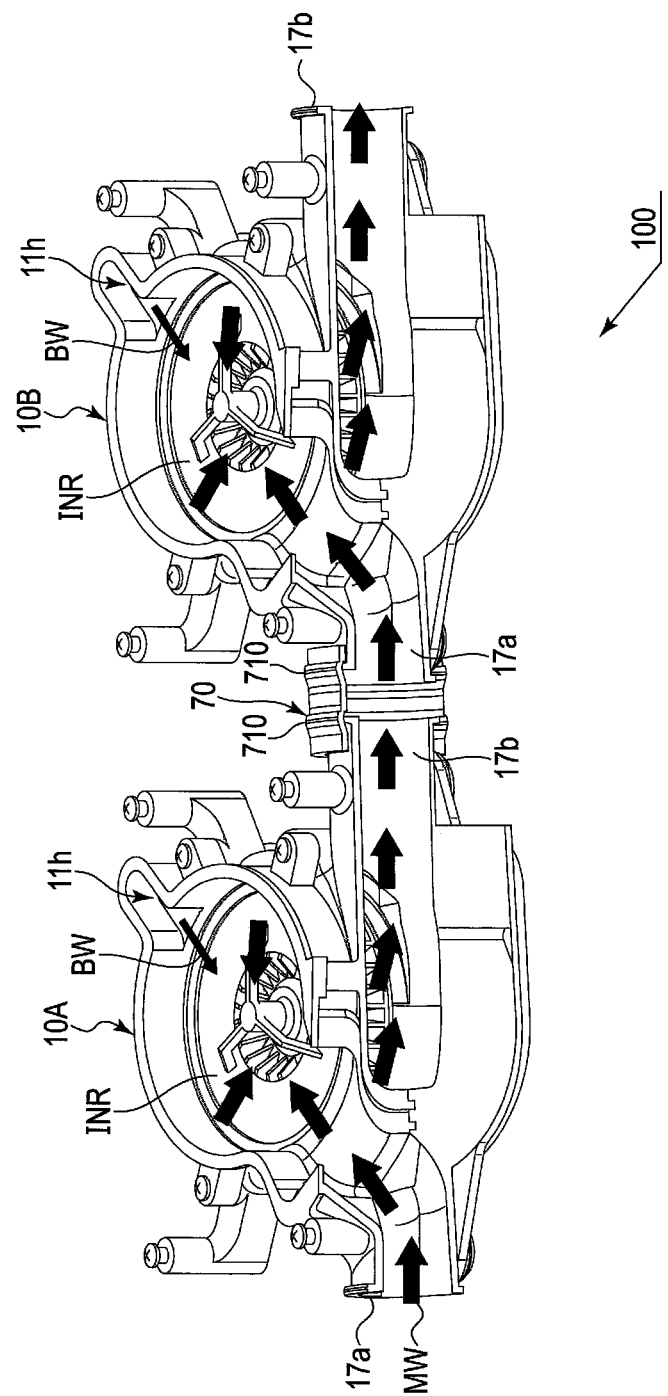
FIG. 9 is an exploded perspective view for explaining the flow paths of the air-blowing operation of the blower system according to the second embodiment.

Conversely, in the blower system 100 according to the second embodiment, each of the blower devices 10A and 10B is provided with a bypass flow path BW configured to lead the flow path occurring from the undersurface 13b of the fan 13 again to the top surface 13a of the fan 13, and the blower devices 10A and 10B are cascade-connected by the coupling member 70 (FIG. 7 to FIG. 9). Accordingly, in the blower device 10B on the higher-pressure side on the latter stage, it is possible to suppress the imbalance of pressure occurring between the pressure of the top surfaces 13a of the blades 131 and pressure of the undersurfaces 13b of the blades 131. Moreover, by the coupling member 70, the air discharged from the blower device 10A is introduced again into the blower device 10B from the intake port 17a thereof in the state where the pressure of the discharged air is maintained as it is. As described above, according to the second embodiment, it is possible to realize a blower system 100 having high reliability in which a plurality of blower devices 10A and 10B are cascade-connected.

Furthermore, by the cascade connection, in the blower system 100, on the whole, the motors 12 of the two stages are substantially separated into two single motors, and hence the amount of heat generation of the coils 125 is also substantially separated into two parts. Accordingly, it is possible to improve the individual cooling efficiency of the main flow path MW and bypass flow path BW, and improve the output.

Third Embodiment (Example of Blower System in Which Three Blower Devices are Connected)

Figure 10:
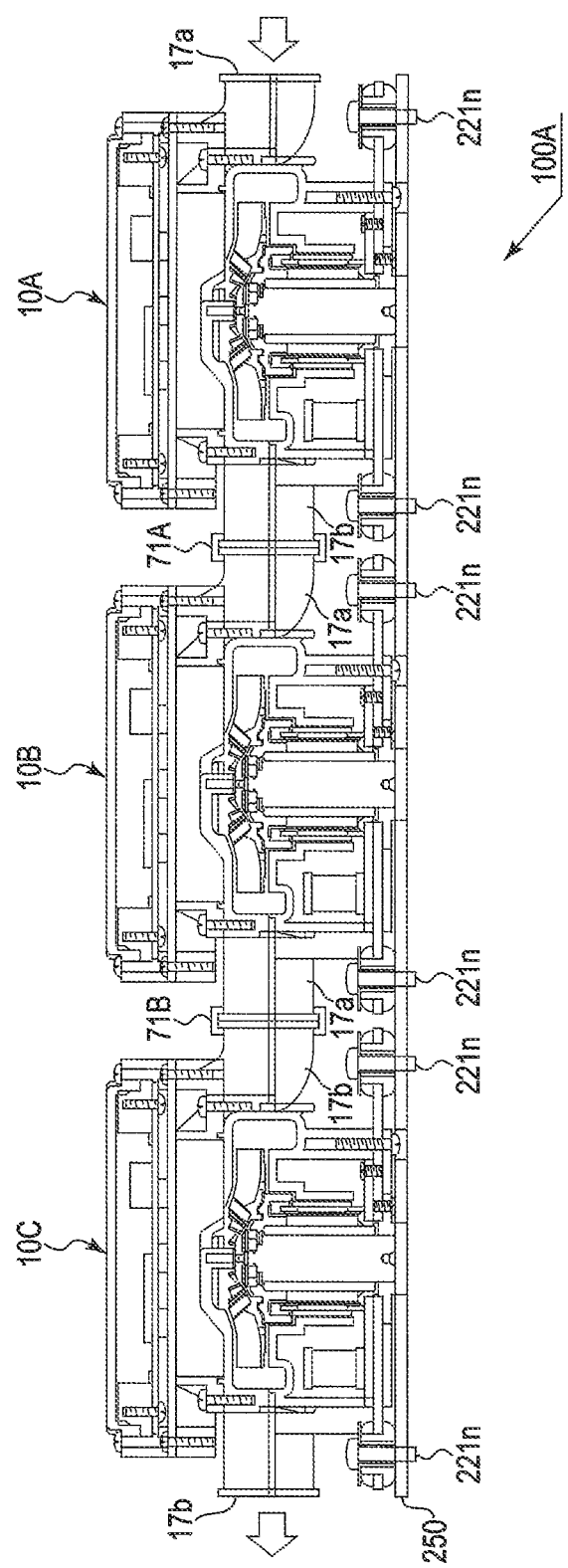
FIG. 10 is a cross-sectional view schematically showing a blower system according to a third embodiment.

A blower system 100A according to a third embodiment will be described below by using FIG. 10. FIG. 10 is a cross-sectional view showing an outline of the blower system 100A according to the third embodiment. The third embodiment is an example of a blower system in which three blower devices are cascade-connected in a straight line.

[Configuration and Air-Blowing Operation]

As shown in FIG. 10, the blower system 100A according to the third embodiment differs from the second embodiment in that the third embodiment is further provided with a blower device 10C, and the three blower devices 10A to 10C are cascade-connected in a straight line. The blower devices 10B and 10C are coupled to each other by a coupling member 71B.

Other configurations and air-blowing operation are substantially identical to the above-mentioned second embodiment, and hence their detailed descriptions are omitted.

[Function and Advantage]

According to the blower system 100A associated with the third embodiment, at least a function and advantage identical to the aforementioned first and second embodiments can be obtained. Furthermore, the blower system 100A according to the third embodiment is further provided with the blower device 10C, and the three blower devices 10A to 10C are cascade-connected in a straight line as compared with the second embodiment. Accordingly, the blower system 100A according to the third embodiment is advantageous in that the blast pressure can further be enhanced, and the blowing efficiency can further be improved. It is possible to apply the blower system 100A according to the third embodiment as the need arises.

Fourth Embodiment (Example of Blower System in Which Blower Devices are Connected to Each Other in Such a Manner That Top Surfaces of the Blower Devices are Opposed to Each Other)

Figure 11:
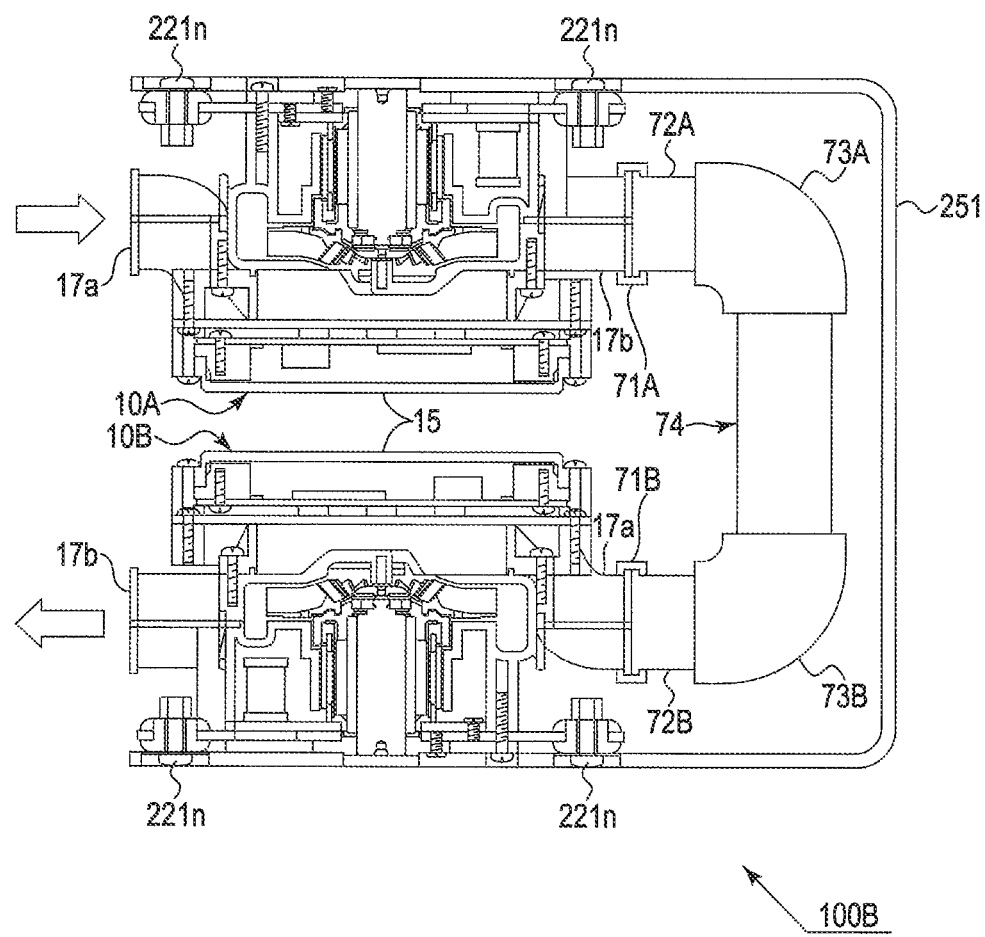
FIG. 11 is a cross-sectional view schematically showing a blower system according to a fourth embodiment.

A blower system 100B according to a fourth embodiment will be described below by using FIG. 11. FIG. 11 is a cross-sectional view showing an outline of the blower system 100B according to the fourth embodiment. The fourth embodiment is an example of a blower system 100B in which two blower devices are cascade-connected in a U-shaped form in such a manner that the top surfaces of the blower devices are opposed to each other.

[Configuration and Air-Blowing Operation]

As shown in FIG. 11, the blower system 100B according to the fourth embodiment is different from the second embodiment in that the two blower devices 10A and 10B are arranged in such a manner that the board covers 15 which are the top surfaces of the two blower devices 10A and 10B are opposed to each other, and are cascade-connected in a U-shaped form.

The exhaust port 17b of the blower device 10A and intake port 17a of the blower device 10B are connected to each other with a connecting member 74 through coupling members 71A and 71B. The connecting member 74 includes members 72A and 72B of the straight parts and elbow members 73A and 73B of the joint parts. The elbow members 73A and 73B have a tubular shape, and hence are configured to be capable of expansion and contraction.

It should be noted that the attaching screws 221n are fixed to predetermined attaching positions, whereby the blower system 100B is attached to a mounting plate 251 having a U-shaped form.

Other configurations and air-blowing operation are substantially identical to the above-mentioned third embodiment, and hence their detailed descriptions are omitted.

[Function and Advantage]

According to the blower system 100B associated with the fourth embodiment, at least a function and advantage identical to the aforementioned first to third embodiments can be obtained. Furthermore, in the blower system 100B according to the fourth embodiment, the two blower devices 10A and 10B are arranged in such a manner that the board covers 15 which are the top surfaces of the two blower devices 10A and 10B are opposed to each other, and are cascade-connected in a U-shaped form. Accordingly, it is advantageous in that the cascade-connected blower system 100B can be arranged regardless of the gravity even at limited places such as a U-shaped gap or the like of a wall of a hospital. As described above, it is possible to apply the blower system 100B according to the fourth embodiment as the need arises.

Fifth Embodiment (Example of Blower System in Which Three Blower Devices are Connected to Each Other in a U-Shaped Form)

Figure 12:
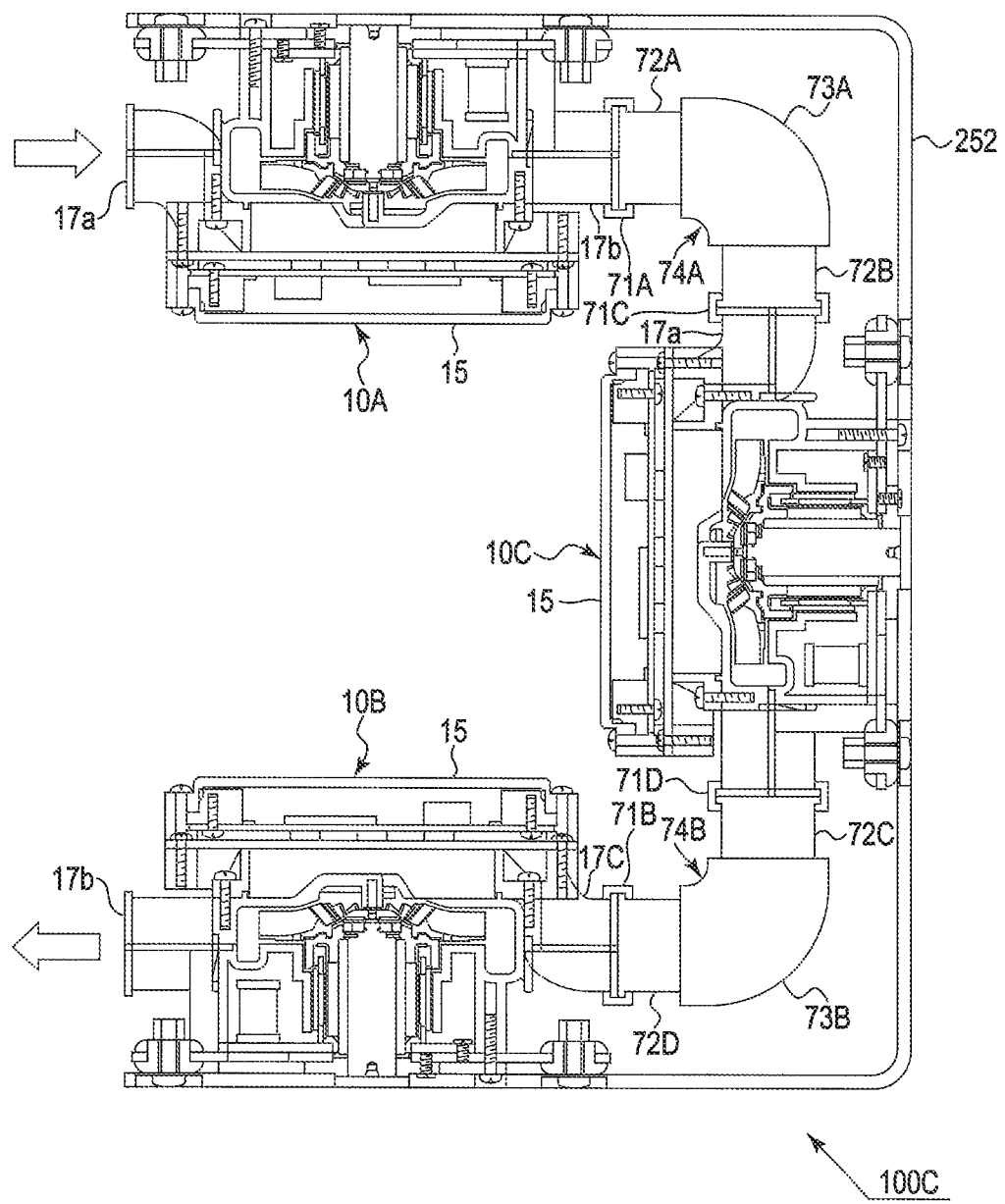
FIG. 12 is a cross-sectional view schematically showing a blower system according to a fifth embodiment.

A blower system 100C according to a fifth embodiment will be described below by using FIG. 12. FIG. 12 is a cross-sectional view showing an outline of the blower system 100C according to the fifth embodiment. The fifth embodiment is an example of a blower system 100C in which three blower devices are cascade-connected in a U-shaped form.

[Configuration and Air-Blowing Operation]

As shown in FIG. 12, the blower system 100C according to the fifth embodiment is different from the fourth embodiment in that the blower system 100C is further provided with a blower device 10C, and the three blower devices 10A to 10C are cascade-connected in a U-shaped form. The blower device 10C is fixed to an approximately vertical position of a mounting plate 252 in the same manner by means of attaching screws.

The exhaust port 17b of the blower device 10A and intake port 17a of the blower device 10C are connected to each other in the same manner with a connecting member 74A through coupling members 71A and 71C. The connecting member 74A includes members 72A and 72B of the straight parts, and elbow member 73A of the joint part. Further, the intake port 17a of the blower device 10B and exhaust port 17b of the blower device 10C are connected to each other in the same manner with a connecting member 74B through coupling members 71B and 71D. The connecting member 74B includes members 72C and 72D of the straight parts, and elbow member 73B of the joint part.

Other configurations and air-blowing operation are substantially identical to the above-mentioned fourth embodiment, and hence their detailed descriptions are omitted.

[Function and Advantage]

According to the blower system 100C associated with the fifth embodiment, at least a function and advantage identical to the aforementioned first to fourth embodiments can be obtained. Furthermore, the blower system 100C according to the fifth embodiment is further provided with the blower device 10C, and the three blower devices 10A to 10C are cascade-connected in a U-shaped form. Accordingly, the blower system 100C according to the fifth embodiment is advantageous in that the blast pressure can further be enhanced, and the blowing efficiency can further be improved as compared with the blower system 100B according to the fourth embodiment. As described above, it is possible to apply the blower system 100C according to the fifth embodiment as the need arises.

MODIFICATION EXAMPLE

The embodiments of the present invention are not limited to the contents disclosed in the above-mentioned first to fifth embodiments, and can be variously modified as the need arises.

For example, in the second to fifth embodiments, although the blower system in which cascade connection is made by using only the blower devices 10 according to the first embodiment is taken as an example, the example is not limited to this configuration. As long as at least the blower device 10 according to the first embodiment is provided, a blower system including a blower device of a different configuration is allowable.

Further, in the second to fifth embodiments, the case where the cascade connection is made by using the coupling members 70, 71, and the like is taken as an example, the example is not limited to such a configuration. For example, in carrying out the cascade connection, a configuration in which the exhaust port 17b of the former stage and intake port 17a of the latter stage can directly be connected to each other by means of, for example, attaching screws or the like is also allowable.

Furthermore, regardless of the gravity, the configuration and shape in which blower devices 10 are coupled to each other are arbitrary. For example, a plurality of blower devices 10 expected to be cascade-connected may be vertically stacked, and the stacked blower devices may be coupled to each other.

For example, a configuration in which the base plates 200 which are the bottom parts of blower devices 10 may be opposed to each other for the purpose of carrying out cascade connection is allowable. However, in this configuration, when the attaching members are common, it is necessary to contrive arrangement in such a manner that attaching screws 221n or the like do not interfere with each other or with the attaching members. In the case of such a configuration, a state where no external wall or the like for attaching the blower devices 10 is available is expected, and hence an attaching member configured to attach the blower devices 10 thereto becomes necessary, and thus it is desirable that arrangement be carried out in consideration of the layout or the like of the portion of the intake port 17a.

Further, the material constituting the housing member 11c, intake cover 14, and board cover 15 may be formed of a material having good thermal conductivity (aluminum or the like). When the above configuration is formed of a material having better thermal conductivity, it becomes possible to further enhance the heat-radiating effect based on the main flow path MW and bypass flow path BW.

Furthermore, the intake cover 14 and heat sinks 20a to 20c may be formed not of different members but of the same member and may also be formed integral with each other. Furthermore, the intake cover 14 and heat sinks 20a to 20c formed integral with each other may also be formed of a material (aluminum or the like) having good thermal conductivity.

Further, although the drive control unit 52 is arranged above the intake chamber INR, the drive control unit 52 is not limited to such a configuration. For example, the drive control unit 52 may also be arranged inside the housing member 11a in the vicinity of the separate coil 125a.

It should be noted that the usage of the blower device 10 and blower systems 100, and 100A to 100C disclosed in the embodiments is not limited to the artificial respirator. The blower device 10 and blower systems 100, and 100A to 100C are widely applicable to other usage items, for example, medical usage or the like for Continuous Positive Airway Pressure (CPAP) for medical treatment of a sleep-apnea syndrome.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A blower device comprising:
   a housing including an intake chamber configured to take in external air from an intake port, an accommodation chamber communicating with the intake chamber through an opening, and an exhaust port configured to discharge the air inside the accommodation chamber to the outside of the accommodation chamber;
   a motor provided in the accommodation chamber of the housing and including a coil;
   a fan provided on a rotating shaft of the motor and configured to introduce the air inside the intake chamber from the opening into the accommodation chamber and blow the air from the accommodation chamber to the exhaust port;

a sealing member configured to seal up the intake chamber; and a flow path of the air which is introduced into a gap between a first surface of the fan and the housing, is returned from a flow path hole provided in the housing and communicating with the intake chamber, and is introduced to a second surface of the fan opposed to the first surface by an air-blowing operation of the fan.

2. The blower device of claim 1, further comprising a circuit board on which a circuit component configured to drive the motor is arranged.

3. The blower device of claim 1, wherein
the intake chamber is arranged in a flow path of air flowing from the intake port to the fan.

4. The blower device of claim 2, wherein
the intake chamber is arranged in a flow path of air flowing from the intake port to the fan.

5. The blower device of claim 1, further comprising a circuit board and a heat-radiation member, wherein the heat-radiation member is provided between the sealing member and the circuit board.

6. The blower device of claim 1, further comprising:
a circuit board;
a separate coil electrically connected to the coil and functioning as an inductor; and
a board cover arranged in such a manner as to cover the circuit board and constituting a circuit chamber accommodating therein a circuit component with the circuit board.

7. The blower device of claim 5, wherein
the sealing member and the heat-radiation member are formed integral with each other, and the sealing member and the heat-radiation member contain aluminum.

8. A blower system comprising a plurality of blower devices of claim 1, wherein
a first exhaust port of one of the blower devices and a first intake port of another of the blower devices are connected in series.

9. The blower system of claim 8, further comprising a coupling member configured to couple the first exhaust port and the first intake port to each other.

* * * * *